United States Patent
Amano

(10) Patent No.: US 8,488,053 B2
(45) Date of Patent: Jul. 16, 2013

(54) IMAGING DEVICE FOR USE WITH DETACHABLE LENS AND CORRESPONDING SHUTTER BRAKE SYSTEM

(75) Inventor: Ryosuke Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 12/503,898

(22) Filed: Jul. 16, 2009

(65) Prior Publication Data
US 2010/0013971 A1    Jan. 21, 2010

(30) Foreign Application Priority Data

Jul. 18, 2008  (JP) ................... P2008-187841

(51) Int. Cl.
*H04N 5/238* (2006.01)
(52) U.S. Cl.
USPC ........... 348/368; 352/208; 352/219; 396/493; 396/495; 396/497
(58) Field of Classification Search
USPC ........... 348/368, 367; 396/452–504; 352/208, 352/219
See application file for complete search history.

(56) References Cited

U.S. PATENT DOCUMENTS

| 4,257,693 A | 3/1981 | Hirata et al. |
| 4,322,140 A | 3/1982 | Takimoto et al. |
| 4,551,763 A | 11/1985 | Swinehart et al. |
| 4,576,456 A | 3/1986 | Okino et al. |
| 4,643,548 A | 2/1987 | Swinehart |
| 4,669,841 A * | 6/1987 | Kaneko et al. ................ 352/216 |
| 4,967,281 A * | 10/1990 | Takada .......................... 348/361 |
| 7,276,686 B2 | 10/2007 | Haubmann |
| 2008/0049117 A1* | 2/2008 | Watanabe ................. 348/222.1 |

FOREIGN PATENT DOCUMENTS

| JP | 5 91388 | 4/1993 |
| JP | 2000 92504 | 3/2000 |
| JP | 2006-308841 | 11/2006 |

* cited by examiner

*Primary Examiner* — Sinh Tran
*Assistant Examiner* — Paul Berardesca
(74) *Attorney, Agent, or Firm* — Frommer Lawrence & Haug LLP; William S. Frommer

(57) ABSTRACT

Disclosed herein is an imaging device including: a lens mount section with a removable lens section; an imaging element adapted to generate a video signal by converting image light of the subject entering through the lens section attached to the lens mount section into an electric signal; a disk-shaped shutter having a light shielding section and a transmission section, the light shielding section adapted to shield the imaging element from incident light, and the transmission section adapted to transmit incident light onto the imaging element; a shutter drive motor adapted to drive the disk-shaped shutter; a detection section adapted to detect whether the lens section is attached or detached; and a shutter control section adapted to supply a control signal to the shutter drive motor to stop the shutter if the detection section has detected that the lens section is detached.

8 Claims, 14 Drawing Sheets

CONFIGURATION EXAMPLE OF ROTARY SHUTTER

IMAGING DEVICE FOR USE WITH DETACHABLE LENS AND CORRESPONDING SHUTTER BRAKE SYSTEM

BACKGROUND OF THE INVENTION

1. Field of the Invention

The present invention relates to an imaging device suitable for use as an imaging device for capturing an image using, for example, a removable lens.

2. Description of the Related Art

In an imaging device using an FT CCD (Frame Transfer Charge Coupled Device) image sensor, the image area (light-receiving section) is shielded from light during signal charge readout. In contrast, in an imaging device using a CMOS (Complementary Metal Oxide Semiconductor) image sensor, the image area is shielded from light during signal charge readout to achieve the concurrency of signal charge accumulation. A rotary shutter is known as a technique to shield the image area from light.

For example, Japanese Patent Laid-open No. 2006-308841 discloses a shutter device and camcorder for providing reduced difference in level of smear appearing on both sides of the imaging surface of the imaging element.

SUMMARY OF THE INVENTION

Incidentally, a variety of types of removable lenses (hereinafter also referred to as simply lenses) are replaced in a video camcorder for movie filming to provide extensive filming effect. At a filming site, the video camcorder is not turned off each time the removable lens is replaced for quick filming. As a result, the rotary shutter continues to rotate during replacement of the removable lens.

That is, when the removable lens is detached from the lens mount, the rotary shutter is exposed and rotating where it is accessible by the user. This is an extremely dangerous situation which can result in finger loss.

A possible countermeasure to prevent such an accident would be to insert, for example, a glass plate between the lens mount and rotary shutter so that the rotary shutter is not directly manually accessible. At this time, if the glass plate is inserted while at the same time maintaining the optical distance from the rearmost end of the lens to the focal plane, i.e., the back focus, constant, the rotary shutter will be closer to the imaging surface.

However, the closer the rotary shutter is positioned to the imaging surface, the larger the difference in exposure timing between the different positions across the imaging surface. That is, when the rotary shutter rotates clockwise, there is a difference in exposure timing between the top left and bottom right positions of the imaging surface. Conversely, the closer the rotary shutter is positioned to the lens pupil, the smaller the difference in exposure timing between the different positions across the imaging surface.

Therefore, the rotary shutter should be positioned close to the lens exit pupil to the extent possible. FIG. 16 illustrates the relationship between the lens-to-imaging-element distance and the rotary shutter position. The pupil position is denoted by reference numeral A, and the position immediately in front of the imaging element by reference numeral E. The positions between the positions A and E are denoted by reference numerals B, C and D in order of closeness to the position A.

In FIG. 16, the width desired to shield light entering through the top end of the lens is shown by dashed lines, and the width desired to shield light entering through the bottom end of the lens by long dashed short dashed lines. It is clear from FIG. 16 that upper and bottom ends Te and Be of the imaging surface of the imaging element can be simultaneously and completely shielded from light if the rotary shutter adapted to shield light is provided at the position A. Because of these reasons, the rotary shutter should preferably be positioned close to the rear lens.

However, the closer the rotary shutter is positioned to the pupil, the more dangerous it is to replace the lenses.

The embodiments of the present invention have been made in light of the foregoing problems, and it is an aim of the embodiments of the present invention to prevent the risk associated with lens replacement without moving the rotary shutter closer to the imaging surface.

An imaging device according to the embodiments of the present invention includes a lens mount section with a removable lens section and an imaging element. The imaging element generates a video signal by converting image light of the subject entering through the lens section attached to the lens mount section into an electric signal. The imaging device further includes a disk-shaped shutter having a light shielding section and a transmission section. The light shielding section shields the imaging element from incident light. The transmission section transmits incident light onto the imaging element. The imaging device still further includes a shutter drive motor. The shutter drive motor drives the disk-shaped shutter. The imaging device still further includes a detection section and shutter control section. The detection section detects whether the lens section is attached or detached. The shutter control section supplies a control signal to the shutter drive motor to stop the shutter if the detection section has detected that the lens section is detached.

Thanks to the above configuration, the shutter control section supplies a control signal to the shutter drive motor to stop the shutter when the lens is detached.

The embodiments of the present invention allow for the shutter control section to supply a control signal to the shutter drive motor when the lens is detached, stopping the rotary shutter.

This eliminates the likelihood of the user touching the rotating rotary shutter by hand, thus eliminating the need to move the rotary shutter closer to the imaging surface.

BRIEF DESCRIPTION OF THE DRAWINGS

FIG. 3A illustrates the imaging device with a lens attached thereto, and FIG. 3B illustrates the imaging device with the lens detached therefrom;

FIG. 6A illustrates the imaging device with the lens attached thereto, and FIG. 6B illustrates the imaging device with the lens detached therefrom;

FIG. 7A illustrates the imaging device with the lens attached thereto, and FIG. 7B illustrates the imaging device with the lens detached therefrom;

FIG. 8A illustrates the imaging device with the lens attached thereto, and FIG. 8B illustrates the imaging device with the lens detached therefrom;

FIG. 9A illustrates the imaging device with the lens attached thereto, and FIG. 9B illustrates the imaging device with the lens detached therefrom;

FIG. 10A illustrates the imaging device with the lens attached thereto, and FIG. 10B illustrates the imaging device with the lens detached therefrom;

FIG. 11A illustrates the imaging device with the lens attached thereto, and FIG. 11B illustrates the imaging device with the lens detached therefrom;

DETAILED DESCRIPTION OF THE PREFERRED EMBODIMENTS

Preferred embodiments of the present invention will be described below with reference to FIGS. 1 to 15. The imaging device according to the preferred embodiments has a removable lens which is attached to or detached from the imaging device. The imaging device includes a rotary shutter adapted to shield the imaging surface from light during a period of time in which the charge is read out from the imaging element. When removable lens is detached from the imaging device, the imaging device controls the rotary shutter to stop at a desired phase.

The preferred embodiments will be described in the following order:

1. Example of internal configuration of the imaging device according to a first embodiment 2. First embodiment [configuration example adapted to control the shutter rotation by electrically detecting the attachment or detachment of the lens]

3. Modification example of the first embodiment [example in which shutter rotation control and braking control are provided as separate modules in the first embodiment]

4. Second embodiment [configuration example adapted to electrically switch between shutter rotation control and braking control in response to the detection result as to the attachment or detachment of the lens]

5. Third embodiment [configuration example adapted to physically switch between shutter rotation control and braking control by physically detecting the attachment or detachment of the lens using a detection pin and plate spring]

6. Fourth embodiment [configuration example adapted to physically detect the attachment or detachment of the lens using a detection pin and plate spring and physically stop the shutter using a brake shoe]

7. Fifth embodiment [configuration example adapted to physically detect the attachment or detachment of the lens using a detection pin and plate spring and electrically control the brake shoe]

8. Sixth embodiment [configuration example adapted to detect the attachment or detachment of the lens using connectors provided on the lens and camcorder]

9. Modification example of the sixth embodiment [configuration example adapted to detect the attachment or detachment of the lens through $I^2C$ communication]

1. Overall Configuration Example of the Imaging Device

Figure 1:
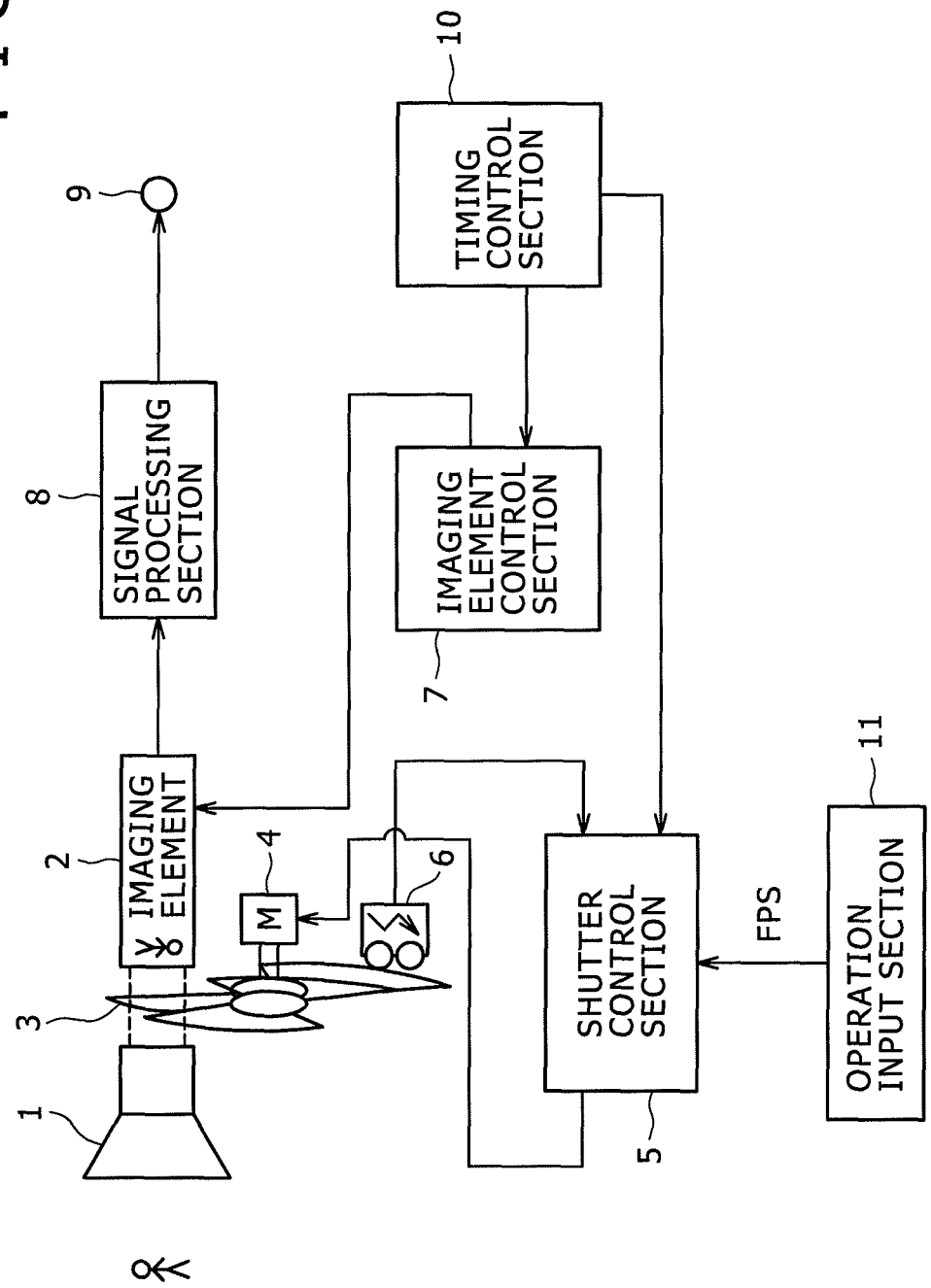
FIG. 1 is a block diagram illustrating an example of internal configuration of an imaging device according to a first embodiment of the present invention.

FIG. 1 illustrates an example of internal configuration of the imaging device according to the present embodiment. The imaging device according to the present embodiment has the variable speed filming capability to achieve filming while smoothly changing the frames per second (hereinafter referred to as FPS). The FPS value is received, for example, from the operation input section which will be described later.

If an arbitrary FPS value is specified, for example, by the user, the imaging device configured as described above captures an image using an imaging element 2 at filming intervals commensurate with the FPS value. Letting the frame synchronization frequency adapted to drive the camcorder system as a whole be denoted by P_F, the frame synchronization frequency P_F and FPS can be expressed by the following relationship:

P_F>FPS

For example, the frame synchronization frequency is set to 240 P for an imaging device capable of being driven at 240 P (240 frames/s, progressive). In this case, however, the FPS value is set by the user to an arbitrary value from 1P to 240P. The phase relationship between the frame synchronization frequency P_F and video signal can be fixed to a given one only when P_F=FPS. In other cases, however, the relationship may not be fixed. That is, the relationship can be generally considered undefined. The FPS value may be specified as desired without being bound by the frame synchronization frequency P_F within the range not exceeding P_F.

The imaging device shown in FIG. 1 includes a lens 1, the imaging element 2 and a rotary shutter 3. The imaging element 2 generates a video signal by converting image light entering through the lens 1 into an electric signal. The rotary shutter 3 opens or shields the image area of the imaging element 2 at given intervals. The imaging device further includes a shutter drive motor 4, shutter control section 5 and shutter position detection section 6. The shutter drive motor 4 rotates the rotary shutter 3. The shutter control section 5 controls the shutter drive motor 4. The shutter position detection section 6 detects the rotation position (rotation phase) of the rotary shutter 3 and outputs the detected position to the shutter control section 5.

The imaging device still further includes an imaging element control section 7, signal processing section 8, video signal output section 9, timing control section 10 and operation input section 11. The imaging element control section 7 controls the operation of the imaging element 2.

[Detailed Description of Example of Internal Configuration of the Imaging Device]

Figure 2:
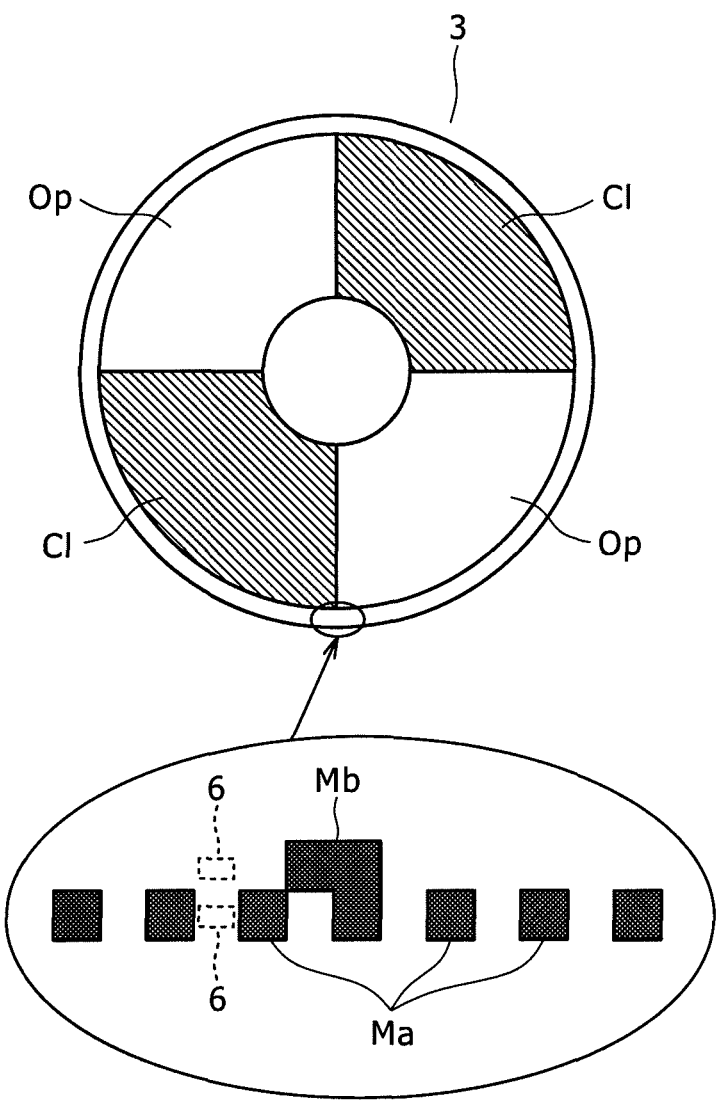
FIG. 2 is an explanatory diagram illustrating an example of configuration of a rotary shutter according to an embodiment of the present invention.

The imaging element 2 includes, for example, a CMOS sensor. The rotary shutter 3 is a disk having two opening portions adapted to transmit light. The same shutter 3 rotates according to control exercised on the shutter drive motor 4. FIG. 2 illustrates a configuration example of the rotary shutter 3. The rotary shutter 3 includes two light shielding portions C1 which are shaded in FIG. 2 and opening portions Op which are not shaded in FIG. 2 so that the shutter shields light twice and opens twice in repeated fashion while the rotary shutter 3 rotates one revolution. Although, in the present embodiment, a case is described in which the rotary shutter 3 has the two opening portions C1, the embodiments of the present invention are not limited thereto, but only one opening portion, for example, may be provided.

In the rotary shutter 3 configured as described above, when the opening portions Op thereof are positioned in front of the image area of the imaging element 2, light of the subject entering from the lens 1 is introduced onto the image area, causing the photoreception signal to be stored. On the other hand, when the light shielding portions C1 are positioned in front of the image area of the imaging element 2, no photoreception signal is stored in the image area.

White and black markings Ma are provided equidistantly at given intervals on the circumference of the disk of the rotary shutter 3 (e.g., 30 markings on the circumference). These markings indicate the circumferential positions. The shutter position detection section 6 detects the rotation position (phase) of the rotary shutter 3 as the rotary encoder (not shown in FIG. 1) reads these markings. More specifically, an unshown pulse signal Pa is pulled high when the sensor reads a black marking, and low when the sensor reads a white marking.

Of the black markings provided on the circumference of the rotary shutter 3, only one has a different shape. The shutter position detection section 6 generates a pulse signal Pb and supplies this signal to the shutter control section 5 when the rotary encoder reads this black marking Mb. The pulse signal Pb differs in width from the pulse signal Pa. In the present embodiment, a marking Mb (second marking) having a different shape is provided on the circumference. However, the embodiments of the present invention are not limited thereto, but two or more such markings may be provided on the circumference.

The shutter control section 5 includes a counter (not shown in FIG. 1) adapted to count the number of times the pulse signal Pa is output from the shutter position detection section 6. The count of the counter is reset when the pulse signal Pb is input. This allows for the shutter control section 5 to obtain, based on a count Cr of the counter, physical position information of the rotary shutter 3 including whether or not the rotary shutter 3 is actually shielding the imaging element 2 from light.

Further, the shutter control section 5 controls the rotation speed of the rotary shutter 3 based on the FPS information from the operation input section 11 while remaining synchronous with the frame synchronization signal from the timing control section 10 which will be described later. The shutter control section 5 receives shutter position information from the shutter position detection section 6 as well as the FPS information. The same section 5 generates, based on these pieces of information, a motor control signal adapted to accommodate the error between the target rotation position (phase) of the rotary shutter 3 determined by the FPS information and the actual rotation position (phase) detected by the shutter position detection section 6. The shutter control section 5 supplies this signal to the shutter drive motor 4. That is, the shutter position detection section 6, shutter control section 5 and shutter drive motor 4 form a feedback loop.

The imaging element control section 7 controls the signal charge readout by driving the unshown horizontal and vertical scan circuits of the imaging element 2 while remaining synchronous with the frame synchronization signal from the timing control section 10 described later.

The signal processing section 8 performs signal processing on the video signal read from the imaging element 2. Such processing includes clamping adapted to fix the video signal black level to a given reference value, edge enhancement adapted to enhance edges and gamma correction adapted to adjust the gamma level according to the gamma characteristic of the display device. The video signal which has undergone the above processing is output, for example, to the unshown recording device connected to the imaging device via the video signal output section 9.

The timing control section 10 generates a frame synchronization signal and supplies this signal to the shutter control section 5 and imaging element control section 7. The operation input section 11 includes, for example, buttons, switches and knobs. When supplied with an FPS from the user, the same section 11 outputs this value to the shutter control section 5.

2. First Embodiment

[Configuration Example of the Imaging Device]

Figure 3A:
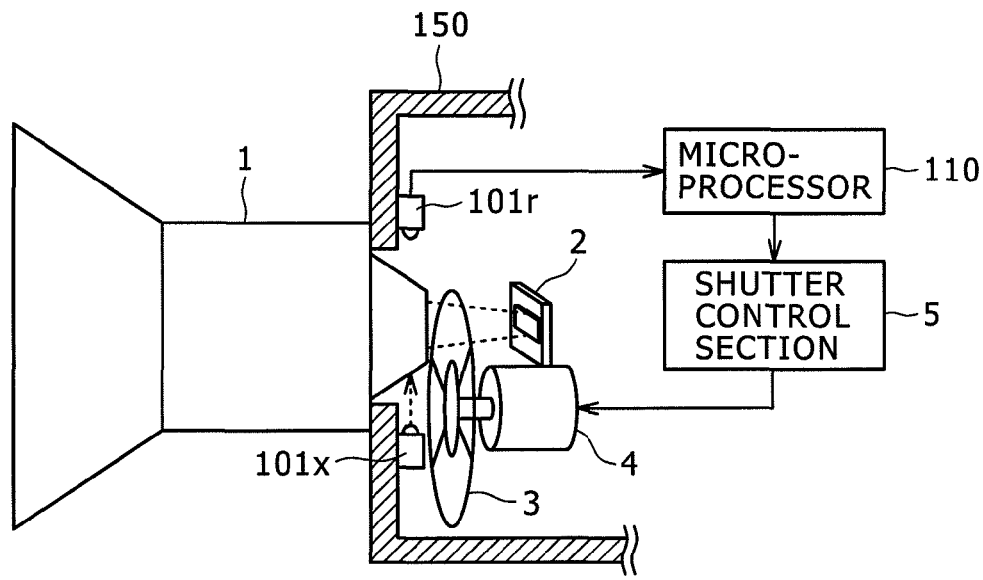
FIGS. 3A and 3B are explanatory diagrams illustrating an example of configuration of the imaging device according to the first embodiment of the present invention.
Figure 3B:
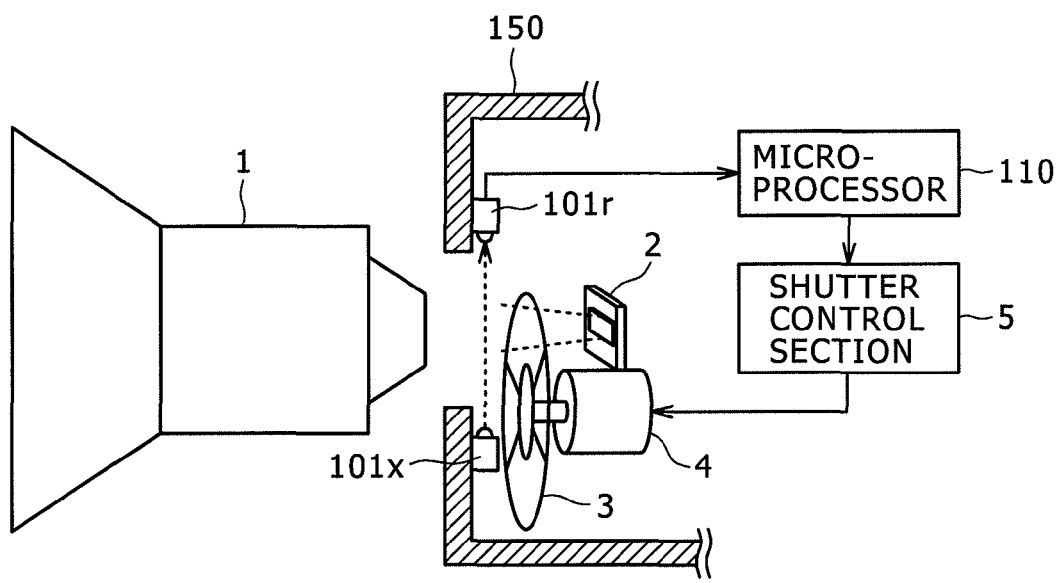

A description will be given next of a configuration example of the imaging device according to the first embodiment adapted to detect the attachment or detachment of the lens with reference to FIGS. 3A and 3B. FIG. 3A illustrates the imaging device with the lens 1 attached thereto. FIG. 3B illustrates the imaging device with the lens 1 detached therefrom. The imaging device shown in FIGS. 3A and 3B has a lens mount Mt provided where the lens 1 is attached to an enclosure 150. The imaging device also has the imaging element 2 provided on the optical path of light entering through the lens 1. The rotary shutter 3 is provided between the rear end portion of the lens 1 and the imaging element 2. The shutter drive motor 4 adapted to drive the rotary shutter 3 is also shown.

The shutter drive motor 4 drives the rotary shutter 3 according to control performed by the shutter control section 5. The same section 5 is supplied with a signal from a microprocessor 110 to rotate or stop the rotary shutter 3. A light-emitting element 101$x$ and light-receiving element 101$r$ are attached near the opening portion for attachment of the lens 1 on the back of the lens mount Mt (on the side of the imaging element 2). The light-emitting element 101$x$ includes, for example, an LED (Light Emitting Diode) or laser diode. The light-receiving element 101$r$ includes, for example, a photosensor. The same element 101$r$ outputs a voltage at a predetermined level to the microprocessor 110 when receiving light from the light-emitting element 101$x$. The voltage does not rise to the predetermined level if the same element 101$r$ does not receive any light.

When no voltage is applied by the light-receiving element 101$r$, the microprocessor 110 determines that the lens 1 is attached to the enclosure 150. In this case, the microprocessor 110 supplies a rotation control signal to the shutter control section 5 to rotate the rotary shutter 3. On the other hand, when a voltage is applied by the light-receiving element 101r, the microprocessor 110 determines that the lens 1 is detached from the enclosure 150. In this case, the microprocessor 110 supplies a braking control signal to the shutter control section 5 to stop the rotation of the rotary shutter 3.

When supplied with a rotation control signal from the microprocessor 110, the shutter control section 5 supplies a motor control signal to the shutter drive motor 4 to rotate the rotary shutter 3. When supplied with a braking control signal from the microprocessor 110, the shutter control section 5 supplies a motor control signal to the shutter drive motor 4 to stop the rotary shutter 3. When supplied with a motor control signal to rotate the rotary shutter 3, the shutter drive motor 4 applies a force in the direction of rotating the rotary shutter 3. When supplied with a motor control signal to stop the rotary shutter 3, the shutter drive motor 4 applies a force in the direction of stopping the same shutter 3. The shutter control section 5 will be described in detail later.

[Operation Example of the Microprocessor]

Figure 4:
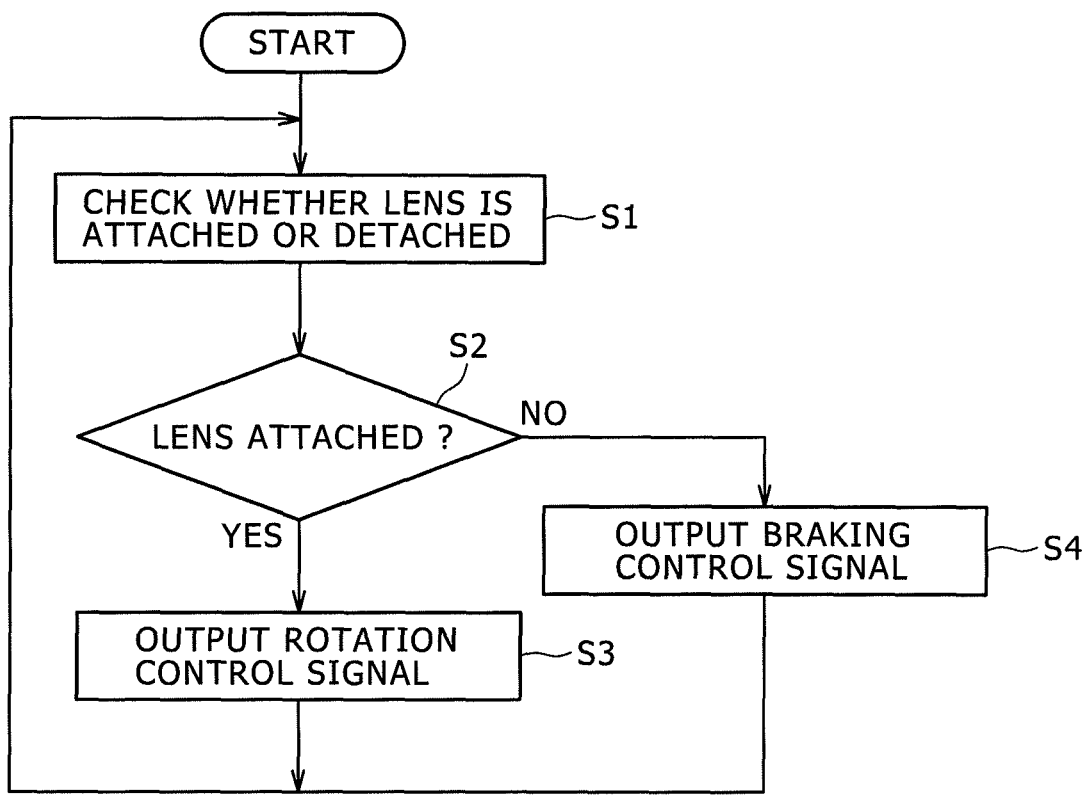
FIG. 4 is a flowchart illustrating an example of processing performed by a microprocessor according to the first embodiment of the present invention.

A description will be given next of an example of processing performed by the microprocessor 110 with reference to FIG. 4. First, the microprocessor 110 detects the attachment or detachment of the lens 1 based on the presence or absence of the voltage applied by the light-receiving element 101r (step S1). Next, the microprocessor 110 determines whether the lens 1 is attached (step S2). When the lens 1 is confirmed to be attached, that is, when no voltage is applied by the light-receiving element 101r, the microprocessor 110 generates a rotation control signal and outputs this signal to the shutter control section 5 (step S3). If the lens 1 is not confirmed to be attached, that is, if a voltage is applied by the light-receiving element 101r, the microprocessor 110 generates a braking control signal and outputs this signal to the shutter control section 5 (step S4).

[Configuration Example of the Shutter Control Section]

Figure 5:
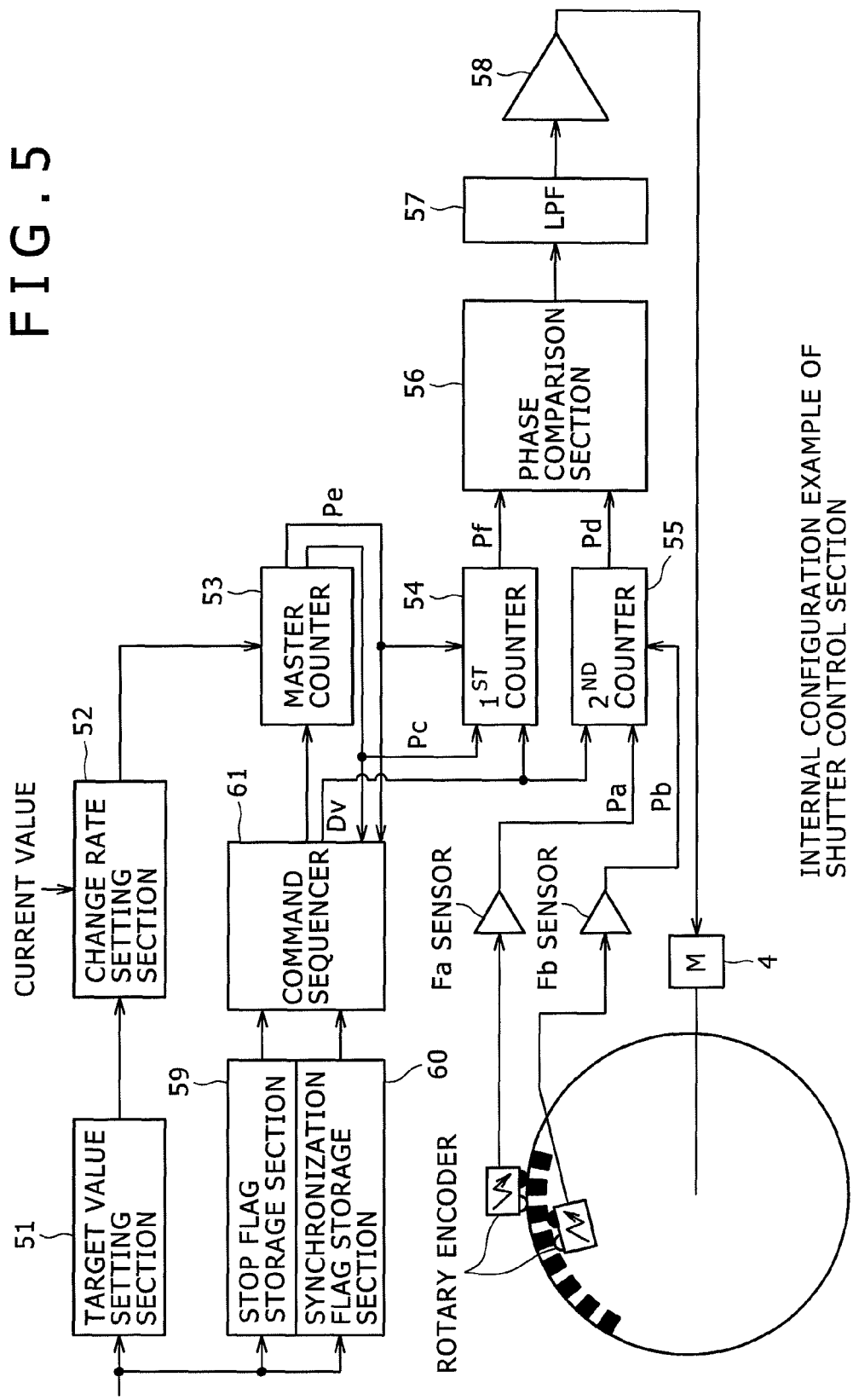
FIG. 5 is a block diagram illustrating an example of internal configuration of a shutter control section according to the first embodiment of the present invention.

A description will be given next of a configuration example of the shutter control section 5 according to the first embodiment with reference to FIG. 5. The shutter control section 5 includes a target value setting section 51, change rate setting section 52 and master counter 53. The same section 5 further includes first and second counters 54 and 55, a phase comparison section 56, low-pass filter (hereinafter referred to as the LPF) 57, amplification section 58, stop flag storage section 59, synchronization flag storage section 60 and command sequencer 61.

The target value setting section 51 is supplied with a target rotation speed per second of the rotary shutter 3 (hereinafter referred to as the target value). When an FPS is specified via the operation input section 11 (refer to FIG. 1), the specified FPS is stored in the same section 51. If no FPS is specified, a normal frame rate is written to the same section 51.

The change rate setting section 52 is supplied with the target value to which the target value setting section 51 has been set. Further, the same section 52 holds the speed at which the rotary shutter 3 is currently instructed to rotate (current speed). Then, the change rate setting section 52 calculates, according to the torque characteristic for the current rotation speed, the closest rotation target value which can be tracked by the shutter drive motor 4 without any overshoot. Here, the closest rotation target value is calculated in consideration of the torque vs. rotation speed characteristic of the shutter drive motor 4, inertia of the rotary shutter 3 and other factors. The change rate setting section 52 calculates, whenever necessary, the closest rotation target value which can be tracked by the shutter drive motor 4 so that the current value approaches the target value. The same section 52 outputs the calculated target value to the master counter 53.

The master counter 53 performs counting at varying intervals according to the closest rotation target value supplied from the change rate setting section 52 and supplies the count to the first counter 54 using pulse strings Pc and Pe. The pulse strings Pc and Pe are in the same format as the pulse signals Pa and Pb. The first counter 54 decodes (converts) the pulse strings Pc and Pe from the master counter 53 into the same format as a pulse signal Pd generated by the second counter 55. The same counter 54 outputs this signal to the phase comparison section 56 as a pulse signal Pf.

The second counter 55 counts the number of times the marking Ma is read, generates a pulse signal Pd and outputs the signal to the phase comparison section 56. The same counter 55 does so based on detection information (pulse signals Pa and Pb) from a sensor Fa adapted to detect the markings Ma provided on the rotary shutter 3.

The phase comparison section 56 compares the phases of the pulse signal Pf from the first counter 54 and the pulse signal Pd from the second counter 55 to find the difference in count between the two counters. The phase comparison section 56 applies a voltage (error signal) commensurate with the detected difference to the LPF 57.

The LPF 57 removes high-frequency components from the error signal from the phase comparison section 56 and outputs the resultant signal to the amplification section 58. The same section 58 generates a control voltage adapted to accommodate the phase difference based on the DC voltage proportional to the phase difference from the LPF 57. The amplification section 58 supplies the control voltage to the shutter drive motor 4.

The stop flag storage section 59 stores a stop flag. The stop flag value is turned on if a braking control signal is supplied from the microprocessor 110, for example, via a serial line (not shown). On the other hand, the synchronization flag storage section 60 stores a synchronization flag. The synchronization flag value is turned on if a synchronization instruction signal is supplied from the microprocessor 110.

The command sequencer 61 supplies control signals to the master, first and second counters 53, 54 and 55 based on the ON/OFF information of the flags stored in the stop flag storage section 59 and synchronization flag storage section 60. For example, the command sequencer 61 supplies the pulse strings Pc and Pe to the master counter 53 to cause the rotary shutter 3 to decelerate gradually and stop. Further, if the command sequencer 61 detects that the stop flag of the stop flag storage section 59 is on, the same sequencer 61 supplies a control signal to the master counter 53 so that the shutter drive motor 4 can stop the rotary shutter 3 at a desired rotation phase. In this case, the master counter 53 ignores the closest rotation target value from the change rate setting section 52 and generates the pulse strings Pc and Pe and outputs these strings to the first counter 54. The pulse strings Pc and Pe have gradually increasing pulse spacings so as to slow down and eventually stop the rotary shutter 3. The user can specify the stopping position of the rotary shutter 3 via the operation input section 11 or other means. More specifically, it is possible to switch between different stopping positions of the rotary shutter 3. Such positions include one where the blades of the rotary shutter 3 shield the imaging element 2 from incident light and another where the rotary shutter 3 transmits incident light onto the imaging element 2.

The command sequencer 61 is supplied with the pulse strings Pc and Pe generated by the master counter 53. The same sequencer 61 calculates, whenever necessary, the optimal frequency that permits easy comparison of the phases by the phase comparison section 56, divides the frame synchronization frequency according to the calculated frequency and supplies the divided frequency to the first and second counters 54 and 55. This is a circuit scheme intended to facilitate the design of the LPF 57 for stable control system and will not adversely affect the speed control of the shutter drive motor 4.

When supplied with a rotation control signal from the microprocessor 110, the shutter control section 5 configured as described above performs servo control so as to bring the rotation speed (current speed) of the rotary shutter 3 closer to the target speed to which the target value setting section 51 is set. On the other hand, when supplied with a braking control signal from the microprocessor 110, the shutter control section 5 stops the rotary shutter 3 through servo control. At this time, the rotary shutter 3 stops where its blades shield the imaging element 2 from light if the same shutter 3 has been set to do so. On the other hand, the rotary shutter 3 stops where incident light is transmitted onto the imaging element 2 if the same shutter 3 has been set to do so.

Therefore, when the lens 1 is detached from the imaging device shown in FIGS. 3A and 3B, a voltage is applied from the light-receiving element 101r to the microprocessor 101, causing the microprocessor 110 to generate a braking control signal. When supplied with the braking control signal from the microprocessor 110, the shutter control section 5 controls the rotary shutter 3 to stop at the predetermined rotation position. Further, when the synchronization flag turns on, the master counter 53 is reset. Such control is used, for example, to keep the mechanical shutters of two camcorders at the same rotation phase.

[Advantageous Effect of the First Embodiment]

The first embodiment described above allows for the imaging device to detect the detachment of the lens 1, automatically stopping the rotary shutter 3. This prevents the user from inadvertently touching the blades of the rotating rotary shutter 3.

On the other hand, if the user's finger, ring or other object touches the rotating rotary shutter 3, the size of the precision-manufactured shutter may change, resulting in unstable rotation of the rotary shutter 3 and inaccurate exposure time. The imaging device according to the present embodiment eliminates the likelihood of the user touching the rotating rotary shutter 3 by hand, thus resolving the above problem. This contributes to reduced maintenance cost for imaging device manufacturers. This also makes it possible for imaging device leasing firms to save losses in compensation and other expenses for the leased imaging device in the event of malfunction thereof.

Further, the present embodiment can stop the rotary shutter 3 where the imaging element 2 is shielded from light, thus preventing buildup of dust or other contaminants on the imaging element 2 or optical parts therearound during replacement of the lens 1.

Still further, the present embodiment can stop the rotary shutter 3 where incident light is transmitted onto the imaging element 2. This facilitates the removal of buildup of dust or other contaminants from the imaging element 2. That is, the present embodiment permits easy user maintenance.

3. Modification Example of the First Embodiment

Figure 6A:
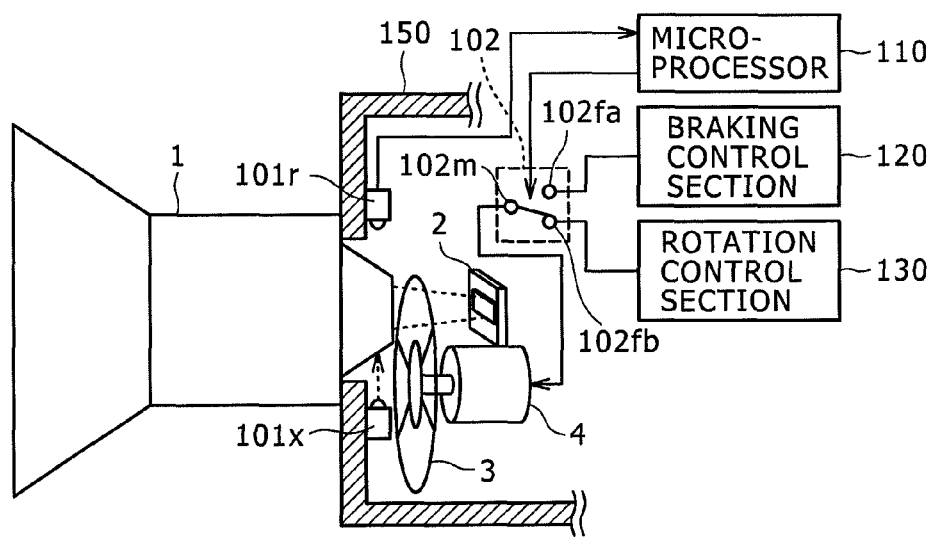
FIGS. 6A and 6B are explanatory diagrams illustrating an example of configuration of the imaging device according to a modification example of the first embodiment of the present invention.
Figure 6B:
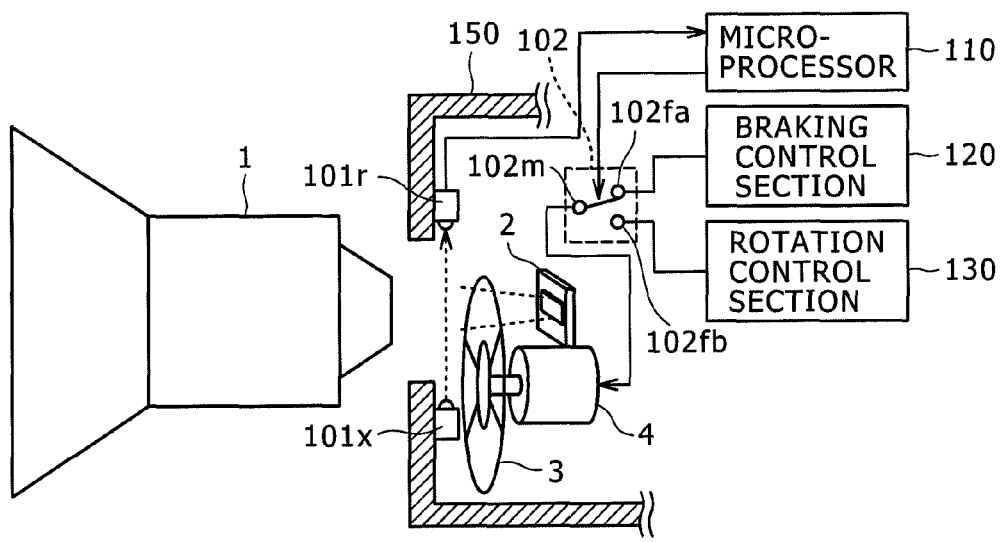

A description will be given next of a modification example of the first embodiment with reference to FIGS. 6A and 6B. In FIGS. 6A and 6B, like components as those in FIGS. 3 are denoted by the same reference numerals, and the detailed description thereof will be omitted. FIG. 6A illustrates the imaging device with the lens 1 attached thereto, and FIG. 6B illustrates the imaging device with the lens 1 detached therefrom.

The imaging device shown in FIGS. 6A and 6B has a braking control section 120 and rotation control section 130 rather than the shutter control section 5 shown in FIGS. 3A and 3B. A switching element 102 switches between the inputs of the braking control section 120 and rotation control section 130. The switching element 102 is, for example, a voltage control switch which includes a movable contact 102m and fixed contacts 102fa and 102fb. The movable contact 102m is connected to the shutter drive motor 4, the fixed contact 102fa to the braking control section 120, and the fixed contact 102fb to the rotation control section 130.

When a rotation control signal is supplied from the microprocessor 110, that is, when the lens 1 is attached to the enclosure 150, the movable contact 102m changes its connection to the fixed contact 102fb which is connected to the rotation control section 130 as illustrated in FIG. 6A. When a braking control signal is supplied from the microprocessor 110, that is, when the lens 1 is detached from the enclosure 150, the movable contact 102m changes its connection to the fixed contact 102fa which is connected to the braking control section 120 as illustrated in FIG. 6B.

The rotation control section 130 performs servo control in synchronism with the frame synchronization signal from the timing control section 10 (refer to FIG. 1) so as to eliminate the error between the target rotation speed of the rotary shutter 3, determined by the user-specified FPS and other parameters, and the actual rotation speed thereof. When supplied with a braking control signal from the microprocessor 110 via the switching element 102, the braking control section 120 supplies no power to the shutter drive motor 4. Alternatively, the braking control section 120 may apply a voltage, opposite in polarity to that applied for rotation control, to the shutter drive motor 4 based on the current rotation speed of the rotary shutter 3 upon reception of a braking control signal as a trigger. This prevents the rotary shutter 3 from rotating in reverse which would otherwise occur if the voltage supply to the shutter drive motor 4 was cut off following the detection of the stoppage of the rotary shutter 3.

Servo control during braking control makes it possible to stop the rotary shutter 3 at a desired position relative to the imaging element 2 as with the imaging device according to the first embodiment.

4. Second Embodiment

Figure 7A:
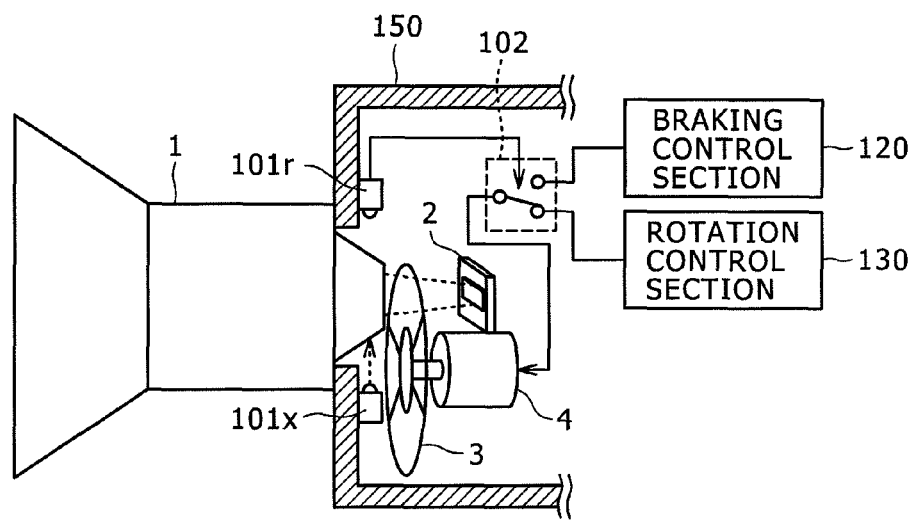
FIGS. 7A and 7B are explanatory diagrams illustrating an example of configuration of the imaging device according to a second embodiment of the present invention.
Figure 7B:
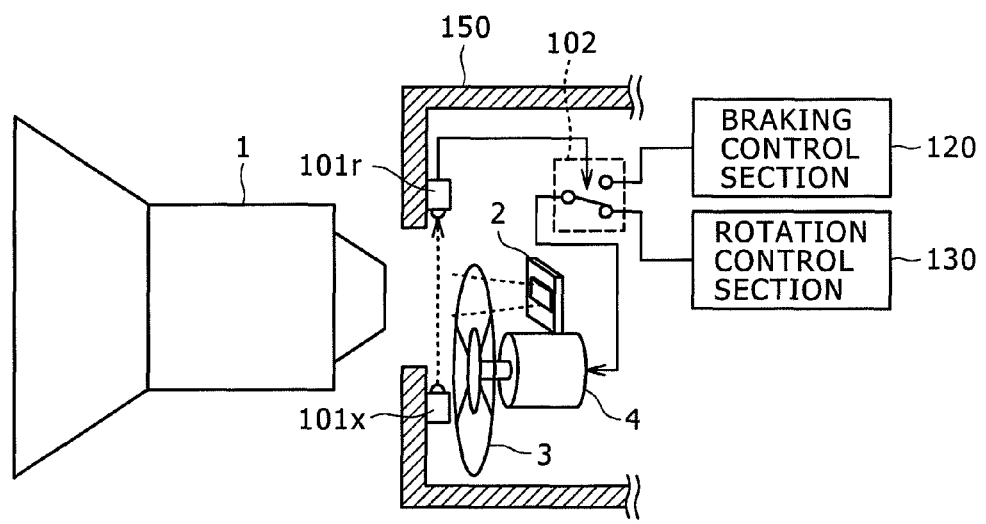

A description will be given next of a second embodiment of the present invention with reference to FIGS. 7A and 7B. In FIGS. 7A and 7B, like components as those in FIGS. 3 and FIGS. 6 are denoted by the same reference numerals, and the detailed description thereof will be omitted. FIG. 7A illustrates the imaging device with the lens 1 attached thereto, and FIG. 7B illustrates the imaging device with the lens 1 detached therefrom.

[Configuration Example of the Imaging Device]

The imaging device shown in FIGS. 7A and 7B does not include the microprocessor 110, and the reception result of the light-receiving element 101r is output directly to the switching element 102. When the light-receiving element 101r receives light, the same element 101r outputs a voltage at a predetermined level to the switching element 102. The movable contact 102m of the switching element 102 connects to the fixed contact 102fa which is connected to the braking control section 120 when a voltage is applied to the switching element 102. The same contact 102m connects to the fixed contact 102fb which is connected to the rotation control section 130 when no voltage is applied to the switching element 102.

The movable contact 102m is connected to the shutter drive motor 4. Therefore, when the switching element 102 is connected to the rotation control section 130, the shutter drive motor 4 is driven based on control performed by the rotation control section 130, rotating the rotary shutter 3. When the switching element 102 is connected to the braking control section 120, the shutter drive motor 4 is driven based on control performed by the braking control section 120, stopping the rotary shutter 3.

[Operation Example of the Imaging Device]

In the imaging device shown in FIGS. 7A and 7B, when the lens 1 is attached, the light-receiving element 101r does not receive light. As a result, the switching element 102 changes its connection to the rotation control section 130, rotating the rotary shutter 3. On the other hand, when the lens 1 is detached, the light-receiving element 101r receives light. As a result, the switching element 102 changes its connection to the braking control section 120, stopping the rotary shutter 3.

5. Third Embodiment

Figure 8A:
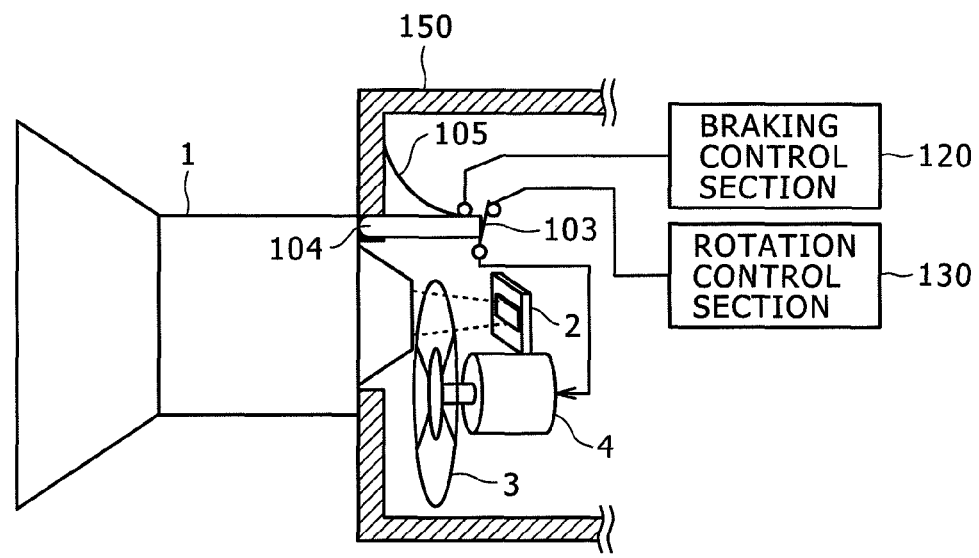
FIGS. 8A and 8B are explanatory diagrams illustrating an example of configuration of the imaging device according to a third embodiment of the present invention.
Figure 8B:
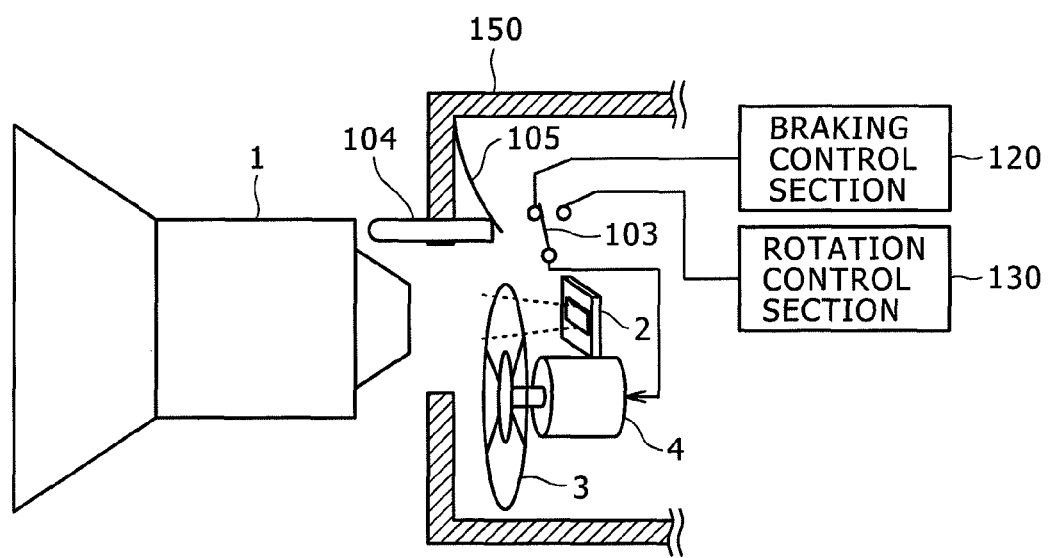

A description will be given next of a third embodiment of the present invention with reference to FIGS. 8A and 8B. In FIGS. 8A and 8B, like components as those in FIGS. 3, FIGS. 6 and FIGS. 7 are denoted by the same reference numerals, and the detailed description thereof will be omitted. FIG. 8A illustrates the imaging device with the lens 1 attached thereto, and FIG. 8B illustrates the imaging device with the lens 1 detached therefrom.

[Configuration Example of the Imaging Device]

The imaging device shown in FIGS. 8A and 8B is configured to detect the attachment or detachment of the lens 1 physically using a detection pin 104 and plate spring 105 rather than electrically.

The imaging device shown in FIGS. 8A and 8B has a hole in proximity to the opening portion to which the lens 1 is attached. The detection pin 104 with a predetermined length is movably fitted in this hole. The plate spring 105 is provided on the back of the lens mount Mt. The plate spring 105 constantly exerts a force to push out the detection pin 104 toward the lens 1.

[Operation Example of the Imaging Device]

As illustrated in FIG. 8A, when the lens 1 is attached to the imaging device, the detection pin 104 is pushed into the imaging device, causing the end portion thereof to press a switch 103. The switch 103 includes the movable contact 102m and fixed contacts 103fa and 103fb. The physical force exerted by the detection pin 104 changes the connection of the movable contact 102m. As with the imaging devices shown in FIGS. 6 and 7, the movable contact 102m is connected to the shutter drive motor 4, the fixed contact 103fa to the braking control section 120, and the fixed contact 103fb to the rotation control section 130.

When the lens 1 is attached, the detection pin 104 is pushed into the imaging device. In response to this force, the movable contact 102m changes its connection to the fixed contact 103fb which is connected to the rotation control section 130 as illustrated in FIG. 8A. On the other hand, when the lens 1 is detached, the detection pin 104 is pushed out of the imaging device, and the end portion of the detection pin 104 separates from the switch 103 as illustrated in FIG. 8B. This changes the connection of the movable contact 102m to the fixed contact 103fa which is connected to the braking control section 120. As described above, the imaging device may be configured to physically switch between rotation control and braking control of the rotary shutter 3 by physically detecting the attachment or detachment of the lens 1.

6. Fourth Embodiment

Figure 9A:
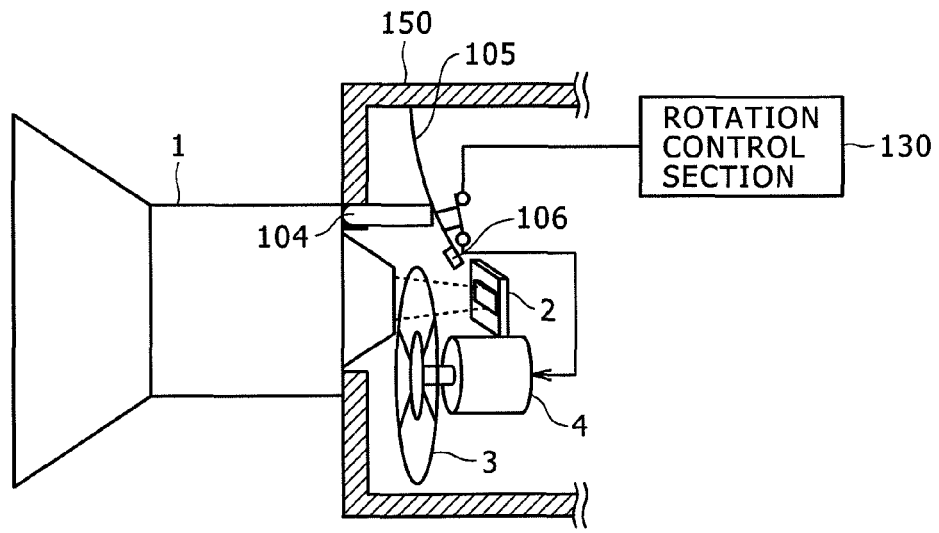
FIGS. 9A and 9B are explanatory diagrams illustrating an example of configuration of the imaging device according to a fourth embodiment of the present invention.
Figure 9B:
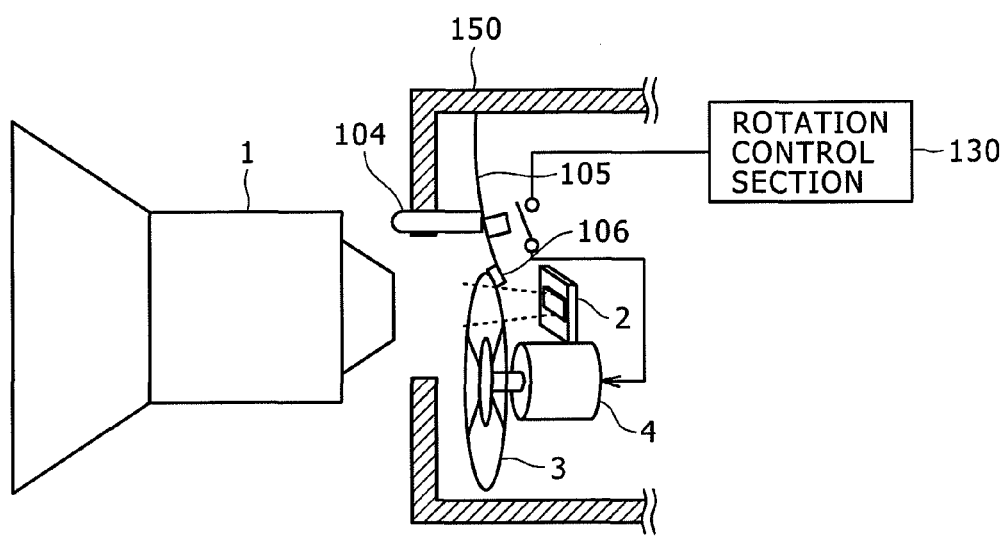

A description will be given next of a fourth embodiment of the present invention with reference to FIGS. 9A and 9B. In FIGS. 9A and 9B, like components as those in FIGS. 3, FIGS. 6, FIGS. 7 and FIGS. 8, are denoted by the same reference numerals, and the detailed description thereof will be omitted. FIG. 9A illustrates the imaging device with the lens 1 attached thereto, and FIG. 9B illustrates the imaging device with the lens 1 detached therefrom.

[Configuration Example of the Imaging Device]

The imaging device shown in FIGS. 9A and 9B has a brake shoe 106 at the tip of the plate spring 105 rather than the braking control module shown in FIGS. 8A and 8B. The rotary shutter 3 stops as the brake shoe 106 touches the rotary shutter 3.

[Operation Example of the Imaging Device]

In the imaging device configured as described above, when the lens 1 is attached to the imaging device, the detection pin 104 is pushed into the imaging device, bending the plate spring 105 toward the inside of the imaging device. As a result, the brake shoe 106, provided at the tip of the plate spring 105, separates from the rotary shutter 3. At the same time, the projection provided on the back of the plate spring 105 presses an open/close switch 107. Alternatively, the end portion of the detection pin 104 may directly press the open/close switch 107.

The open/close switch 107 has one of its terminals connected to the rotation control section 130 and the other of its terminals connected to the shutter drive motor 4. When the lens 1 is attached, the detection pin 104 is pushed into the imaging device. As a result, the contact piece of the open/close switch 107 is pressed, connecting together the two contacts of the same switch 107 as illustrated in FIG. 9A. As the same switch 107 closes, the rotation control section 130 supplies a motor control signal to the shutter drive motor 4, rotating the rotary shutter 3.

When the lens 1 is detached from the imaging device, the force of the plate spring 105 pushes the detection pin 104 out of the imaging device (pushes the pin toward the lens) as illustrated in FIG. 9B, separating the contact piece of the open/close switch 107 from the contact of the rotation control section 130. At the same time, the brake shoe 106 provided at the tip of the plate spring 105 touches the rotary shutter 3, stopping the same shutter 3.

7. Fifth Embodiment

Figure 10A:
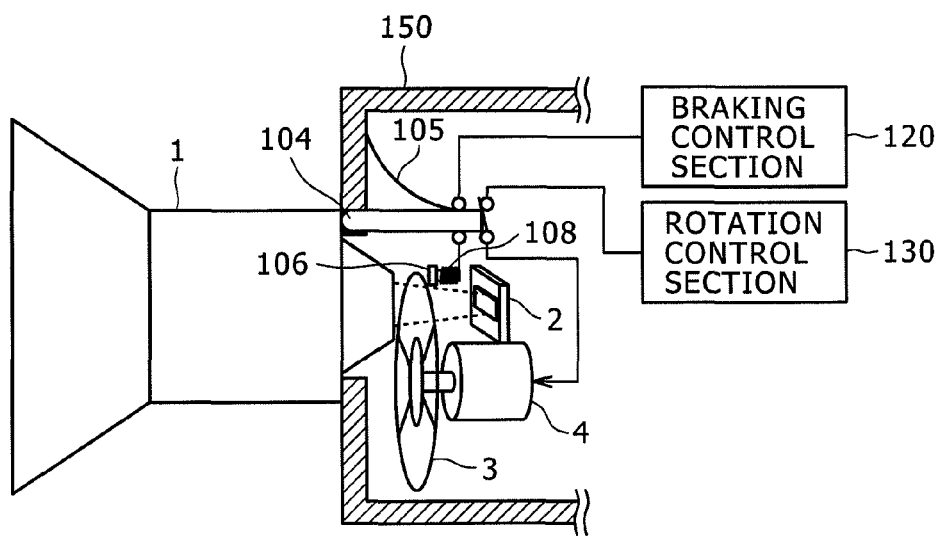
FIGS. 10A and 10B are explanatory diagrams illustrating an example of configuration of the imaging device according to a fifth embodiment of the present invention.
Figure 10B:
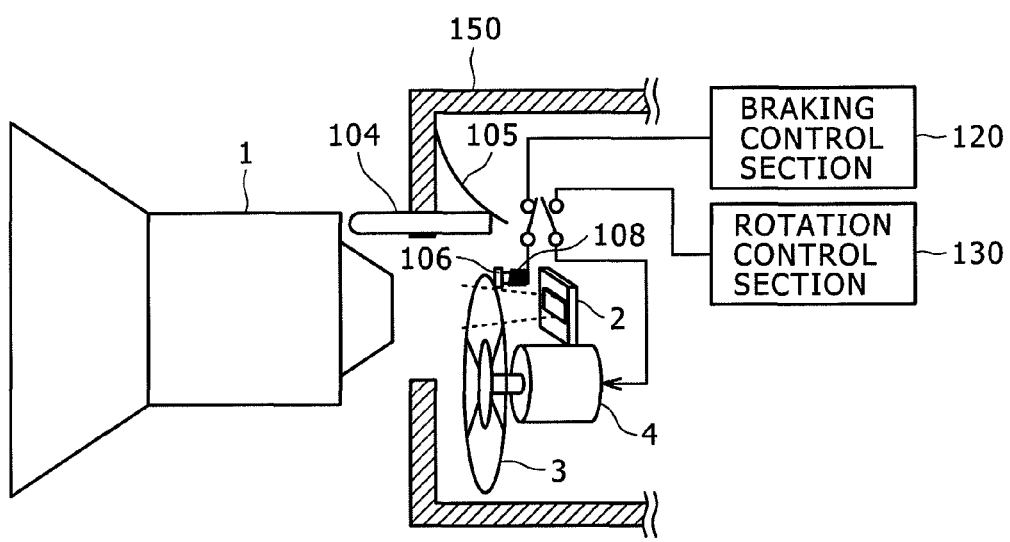

A description will be given next of a fifth embodiment of the present invention with reference to FIGS. 10A and 10B. In FIGS. 10A and 10B, like components as those in FIGS. 3, FIGS. 6, FIGS. 7, FIGS. 8 and FIGS. 9 are denoted by the same reference numerals, and the detailed description thereof will be omitted. FIG. 10A illustrates the imaging device with the lens 1 attached thereto, and FIG. 10B illustrates the imaging device with the lens 1 detached therefrom.

[Configuration Example of the Imaging Device]

The imaging device shown in FIGS. 10A and 10B is configured to electrically control the brake shoe 106 adapted to stop the rotary shutter 3 with a solenoid 108. The solenoid 108 having the brake shoe 106 at its tip is provided on the back of the rotary shutter 3. The solenoid 108 and braking control section 120 are connected together by an open/close switch 107a. The rotation control section 130 and shutter drive motor 4 are also connected together by an open/close switch 107b.

The contact piece of the open/close switch 107a adapted to connect together the braking control section 120 and solenoid 108 tilts into the imaging device when pushed by the detection pin 104, disconnecting the braking control section 120 from the solenoid 108. When the detection pin 104 does not touch the open/close switch 107a, the two contacts of the same switch 107a are connected together, causing the solenoid 108 to move straight toward the rotary shutter 3 based on control performed by the braking control section 120. This brings the brake shoe 106, provided at the tip of the solenoid 108, into contact with the rotary shutter 3, stopping the same shutter 3.

The open/close switch 107b adapted to connect together the rotation control section 130 and shutter drive motor 4 is provided more rearward (deeper in the imaging device) than the open/close switch 107a. The contact piece of the open/close switch 107b is tilted toward the lens 1 when the detection pin 104 does not touch the same switch 107b. In this condition, the rotation control section 130 is disconnected from the shutter drive motor 4. The contact piece of the open/close switch 107b connects to the contact of the rotation control section 130 when pressed by the detection pin 104, electrically connecting together the rotation control section 130 and shutter drive motor 4. The shutter drive motor 4 is driven based on control performed by the rotation control section 130, rotating the rotary shutter 3.

[Operation Example of the Imaging Device]

In the imaging device configured as described above, when the lens 1 is attached to the enclosure 150, the detection pin 104 is pushed into the imaging device as illustrated in FIG. 10A, opening the open/close switch 107a. This disconnects the braking control section 120 from the solenoid 108. At the same time, the detection pin 104 pushed into the imaging device presses the open/close switch 107b, closing the same switch 107b. As the same switch 107b closes, the rotation control section 130 and shutter drive motor 4 are electrically connected together. This rotates the rotary shutter 3 based on control performed by the rotation control section 130.

On the other hand, when the lens 1 is detached from the enclosure 150, the force of the plate spring 105 pushes the detection pin 104 out of the imaging device (toward the lens) as illustrated in FIG. 10B, separating the contact piece of the open/close switch 107b from the contact of the rotation control section 130. At the same time, the open/close switch 107a closes, electrically connecting together the braking control section 120 and shutter drive motor 4. This causes the solenoid 108, connected to the open/close switch 107a, to move straight toward the rotary shutter 3. As a result, the brake shoe 106, provided at the tip of the solenoid 108, comes into contact with the rotary shutter 3, stopping the rotary shutter 3.

8. Sixth Embodiment

Figure 11A:
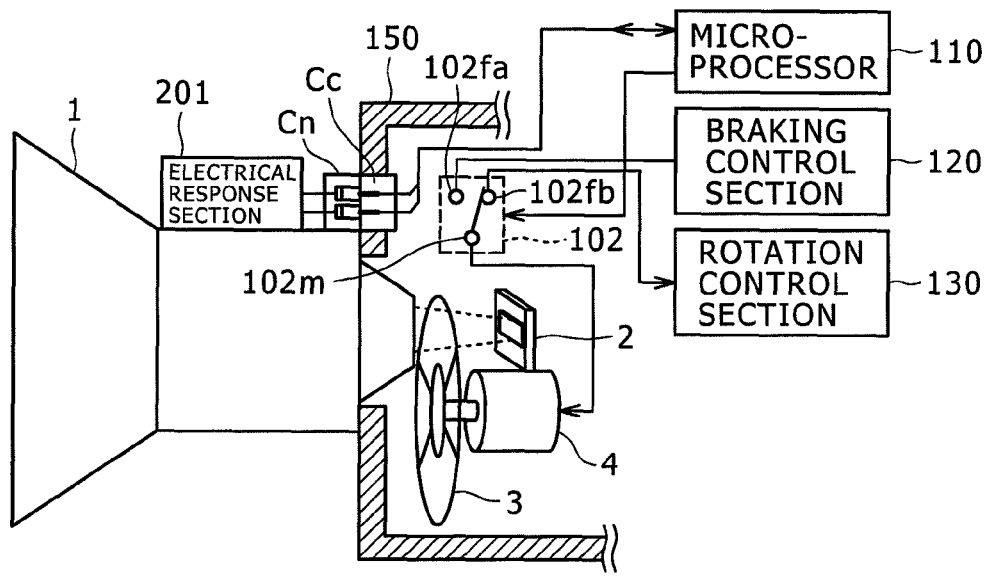
FIGS. 11A and 11B are explanatory diagrams illustrating an example of configuration of the imaging device according to a sixth embodiment of the present invention.
Figure 11B:
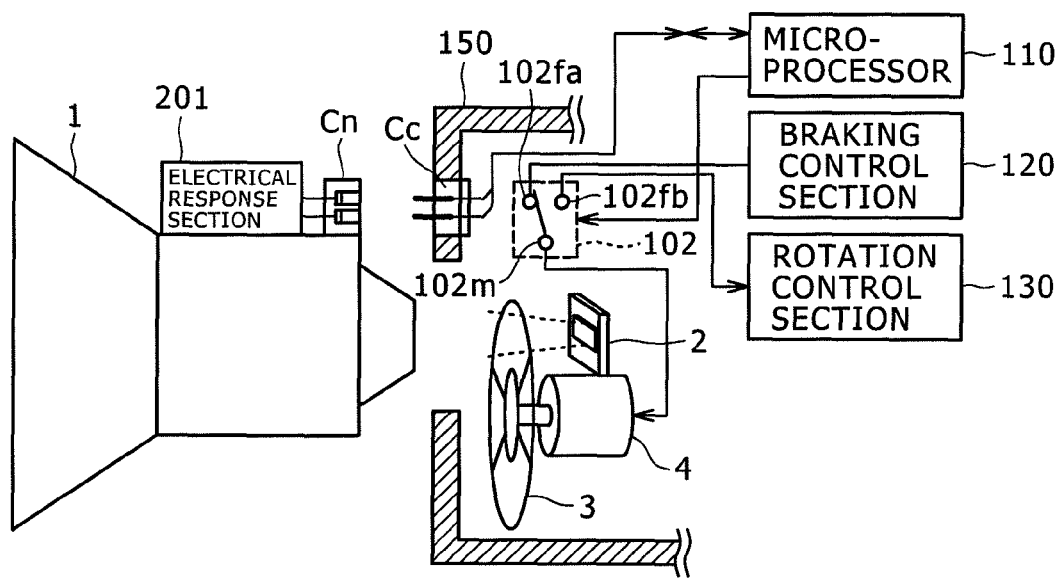

A description will be given next of a sixth embodiment of the present invention with reference to FIGS. 11 to 13. In FIGS. 11A and 11B, like components as those in FIGS. 3, FIGS. 6, FIGS. 7, FIGS. 8, FIGS. 9 and FIGS. 10 are denoted by the same reference numerals, and the detailed description thereof will be omitted. FIG. 11A illustrates the imaging device with the lens 1 attached thereto, and FIG. 11B illustrates the imaging device with the lens 1 detached therefrom.

[Configuration Example of the Imaging Device]

The imaging device shown in FIGS. 11A and 11B is configured to detect the attachment or detachment of the lens 1 using an electrical response section 201 and a connector Cn provided on the lens 1 and a connector Cc provided on the imaging device. The connector Cc provided on the imaging device is connected to the microprocessor 110 with a pulled-up signal line. FIG. 12 illustrates in detail the circuit configuration thereof.

Figure 12:
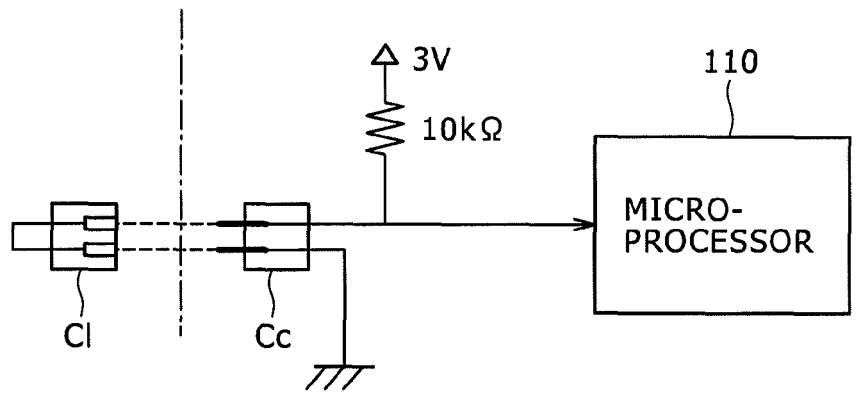
FIG. 12 is a block diagram illustrating the connection between the lens and imaging device according to the sixth embodiment of the present invention.

In the circuit shown in FIG. 12, the signal line connecting together the microprocessor 110 and connector Cc is connected to a 3-volt Vcc with a 10 kΩ pull-up resistor. At the same time, the terminal of the connector Cc not connected to the microprocessor 110 is connected to the ground (GND). In the circuit configured as described above, when the connector Cn on the lens 1 and the connector Cc on the imaging device engage with each other, the signal line is pulled down to the ground potential. On the other hand, when the connectors Cn and Cc disengage from each other, a 3-volt current flows into the microprocessor 110. That is, the microprocessor 110 can detect the attachment or detachment of the lens 1 based on the magnitude of the voltage applied thereto via the signal line.

Figure 13:
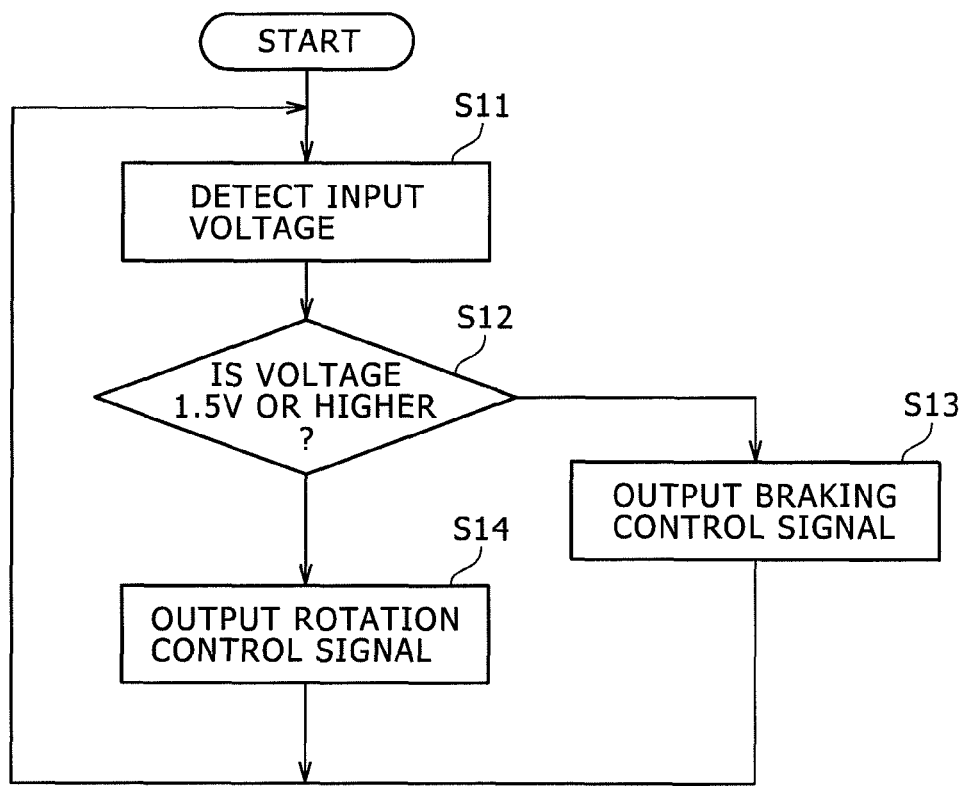
FIG. 13 is a flowchart illustrating an example of processing performed by the microprocessor according to the sixth embodiment of the present invention.

The flowchart in FIG. 13 illustrates an example of processing performed by the microprocessor 110 in the present embodiment. First, the microprocessor 110 detects the input voltage (step S11). Next, the microprocessor 110 determines whether the input voltage is 1.5 V or higher (step S12). When the input voltage is 1.5 V or higher, the microprocessor 110 determines that the lens 1 is attached and outputs a rotation control signal (step S13). If the input voltage is less than 1.5 V, the microprocessor 110 determines that the lens 1 is detached and outputs a braking control signal (step S14).

Referring back to FIG. 11A, the microprocessor 110 supplies a rotation control signal to the switching element 102 when it detects the attachment of the lens 1. The microprocessor 110 supplies a braking control signal to the switching element 102 when it detects the detachment of the lens 1.

The movable contact 102m of the switching element 102 is connected to the shutter drive motor 4, the fixed contact 102fa to the braking control section 120, and the fixed contact 102fb to the rotation control section 130. When a rotation control signal is supplied from the microprocessor 110, the movable contact 102m connects to the fixed contact 102fb which is connected to the rotation control section 130. On the other hand, when a braking control signal is supplied from the microprocessor 110, the movable contact 102m connects to the fixed contact 102fa which is connected to the braking control section 120.

When the movable contact 102m of the switching element 102 is connected to the fixed contact 102fb which is connected to the rotation control section 130, the rotation control section 130 generates a motor control signal based on the rotation control signal from the microprocessor 110 and outputs this control signal to the shutter drive motor 4. This rotates the rotary shutter 3.

When the movable contact 102m of the switching element 102 is connected to the fixed contact 102fa which is connected to the braking control section 120, the braking control section 120 generates a motor control signal based on the braking control signal from the microprocessor 110 and outputs this control signal to the shutter drive motor 4. This stops the rotary shutter 3.

[Operation Example of the Imaging Device]

In the imaging device configured as described above, when the lens 1 is attached to the enclosure 150, the connector Cn on the lens 1 and the connector Cc on the imaging device engage with each other. In this case, the input voltage supplied to the microprocessor 110 is 0V. Therefore, a rotation control signal is generated and supplied to the switching element 102. The movable contact 102m of the switching element 102 connects to the fixed contact 102fb when a rotation control signal is supplied. This electrically connects together the rotation control section 130 and shutter drive motor 4. As a result, the same motor 4 drives the rotary shutter 3 into rotation.

When the lens 1 is detached from the enclosure 150, the connector Cn on the lens 1 and the connector Cc on the imaging device disengage from each other. In this case, the input voltage supplied to the microprocessor 110 is 3V. Therefore, a braking control signal is generated and supplied to the switching element 102. The movable contact 102m of the switching element 102 connects to the fixed contact 102fa when a braking control signal is supplied. This electrically connects together the braking control section 120 and shutter drive motor 4. As a result, the rotary shutter 3 stops.

9. Modification Example of the Sixth Embodiment

Figure 14:
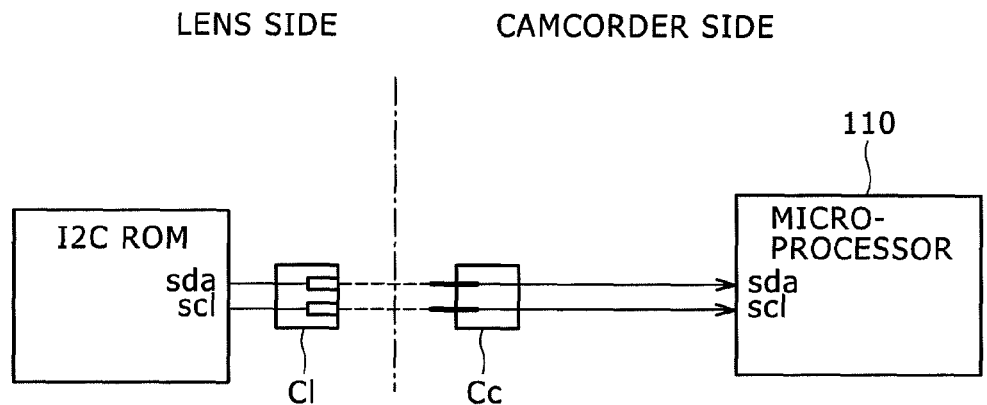
FIG. 14 is a block diagram illustrating the connection between the lens and imaging device according to a modification example of the sixth embodiment of the present invention.

A description will be given next of a modification example of the sixth embodiment with reference to FIGS. 14 and 15. In FIG. 14, like components as those in FIG. 12 are denoted by the same reference numerals. In the present embodiment, the connector Cn on the lens 1 and the connector Cc on the imaging device are connected together by an I²C bus. The imaging device serving as the master detects the attachment or detachment of the lens 1 by monitoring its connection to the lens 1 serving as the slave.

As illustrated in FIG. 14, a ROM (Read Only Memory) 202 is provided on the lens 1 to serve as an I²C interface. The ROM 202 is connected to the connector Cn via two lines, i.e., an sda line adapted to transmit data and an sc1 line adapted to transmit a clock. Further, a slave address is assigned to the lens 1. The connector Cc and microprocessor 110 on the imaging device are also connected together with the sda and sc1 lines.

Figure 15:
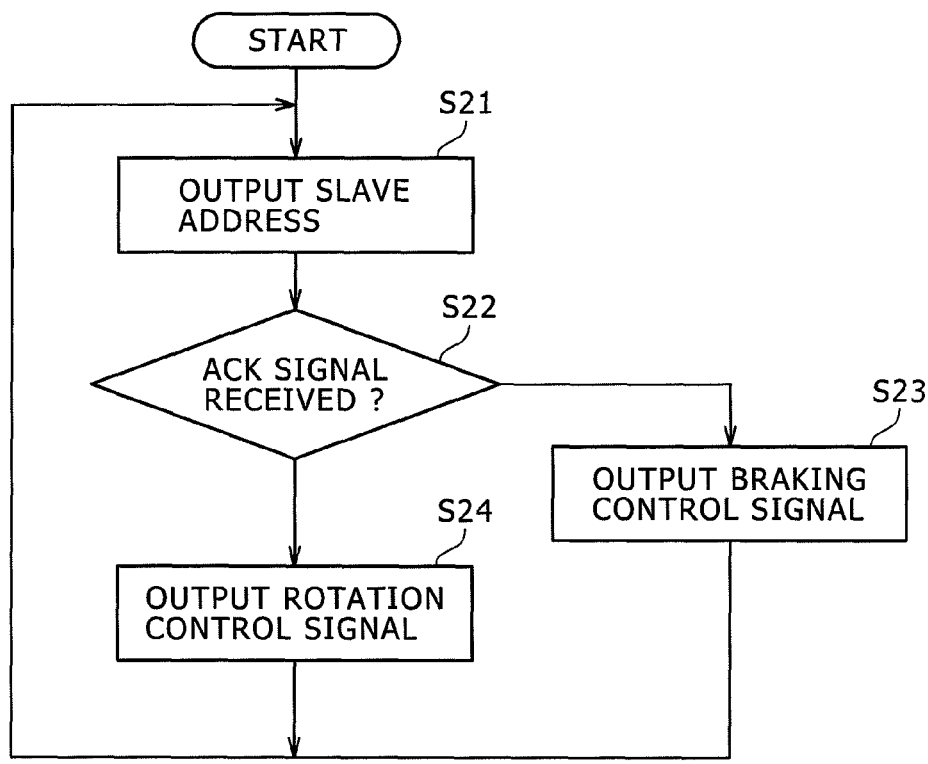
FIG. 15 is a flowchart illustrating an example of processing performed by the microprocessor according to a modification example of the sixth embodiment of the present invention.
Figure 16:
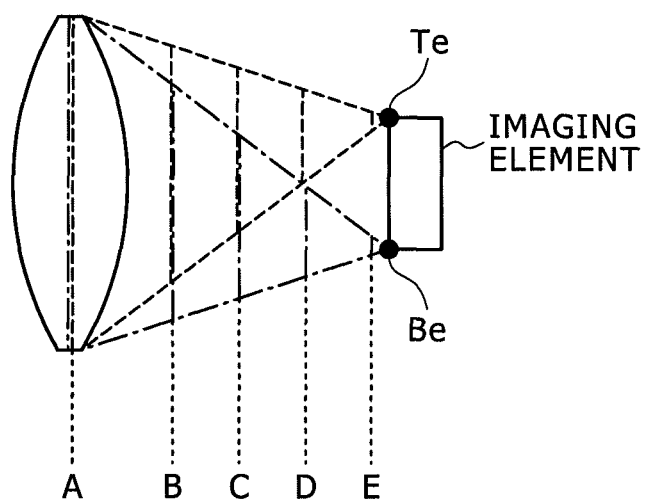
FIG. 16 is an explanatory diagram illustrating an existing example of positional relationship between a pupil, rotary shutter and imaging element.

The flowchart in FIG. 15 illustrates an example of processing performed by the microprocessor 110 configured as shown in FIG. 14. First, the microprocessor 110 outputs a slave address to the slave (step S21). Next, the microprocessor 110 determines whether an acknowledge (hereinafter referred to as the ACK) signal has been received from the slave in response to the slave address, (step S22). If the ACK signal is not received, the connectors Cn and Cc most probably disengage from each other. Therefore, the microprocessor 110 determines that the lens 1 is detached and outputs a braking control signal (step S23).

When the ACK signal is received, the connectors Cn and Cc most probably engage with each other. Therefore, the microprocessor 110 determines that the lens 1 is attached and outputs a rotation control signal (step S24). As described above, the attachment or detachment of the lens 1 may be detected by exchanging signals according to the I²C standard.

The present application contains subject matter related to that disclosed in Japanese Priority Patent Application JP 2008-187841 filed in the Japan Patent Office on Jul. 18, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An imaging device for use with a removable lens and provided with injury protection that prevents injury to a user's finger when the lens is removed, said imaging device comprising:
  a lens mount section with a removable lens section;
  an imaging element adapted to generate a video signal by converting image light of a subject entering through the removable lens section attached to the lens mount section into an electric signal;
  a disk-shaped shutter having a light shielding section and a transmission section, the light shielding section adapted to shield the imaging element from incident light, and the transmission section adapted to transmit incident light onto the imaging element, the disk-shaped shutter accessible by the user's finger when the removable lens section is removed;
  a shutter drive motor adapted to drive the disk-shaped shutter;
  a detection section adapted to detect whether the removable lens section is attached or detached; and
  a shutter control section including:
    a rotation control section adapted to control the shutter drive motor to rotate the disk-shaped shutter,
    a braking control section adapted to stop the disk-shaped shutter, and
    a switch adapted to supply to the rotation control section a rotation control signal to rotate the disk-shaped shutter when the detection section detects that the removable lens section is attached, said switch adapted to supply to the braking control section a braking control signal to stop the disk-shaped shutter in position to shield the imaging element from incident light when the detection section detects that the removable lens section is detached, thereby preventing the disk-shaped shutter from rotating and injure the user when the disk-shaped shutter is exposed to the user's finger.

2. The imaging device of claim 1 comprising:
  a shutter position detection section adapted to detect a rotation position of the disk-shaped shutter, wherein
  the braking control section controls the disk-shaped shutter to stop at a predetermined rotation position based on rotation position information of the disk-shaped shutter detected by the disk-shaped shutter position detection section when the detection section detects detachment of the removable lens section.

3. The imaging device of claim 1, wherein
  the detection section comprises:
    a light-emitting element, and
    a light-receiving element adapted to receive light from the light-emitting element and output a detection signal according to received light intensity, and
  the braking control section outputs a braking control signal to the shutter drive motor to stop the disk-shaped shutter in response to a detection signal from the light-receiving element as a result of attachment of the removable lens section.

4. The imaging device of claim 1, wherein the detection section includes:
  a detection pin adapted to be pushed into the imaging device by a force exerted when the removable lens section is attached, and
  a spring member adapted to constantly exert a force to push the detection pin out of the imaging device, the shutter control section includes:
  a switch adapted to connect together the shutter drive motor and rotation control section or braking control section,
  the switch connects to the rotation control section when pressed by the detection pin, and
  the switch connects to the braking control section when not pressed by the detection pin.

5. The imaging device of claim 1, wherein
  the detection section comprises:
    a detection pin adapted to be pushed into the imaging device by a force exerted when the removable lens section is attached, and
    a spring member adapted to constantly exert a force to push the detection pin out of the imaging device, the spring member having at its tip a brake shoe adapted to stop the disk-shaped shutter,
  the shutter control section includes:
    an open/close switch connected between the rotation control section and shutter drive motor, when the detection pin is pushed into the imaging device, the brake shoe separates from the disk-shaped shutter, and at a same time, the open/close switch closes to electrically connect together the rotation control section and shutter drive motor, and when the detection pin is not pushed into the imaging device, the brake shoe comes into contact with the disk-shaped shutter, and at a same time, the open/close switch opens to electrically disconnect the rotation control section from the shutter drive motor.

6. The imaging device of claim 1, wherein
the detection section includes
a detection pin adapted to be pushed into the imaging device by a force exerted when the removable lens section is attached, and
a spring member adapted to constantly exert a force to push the detection pin out of the imaging device,
the shutter control section includes:
  a solenoid having at its tip a brake shoe adapted to stop the disk-shaped shutter to rotate,
  a first open/close switch connected between the solenoid and braking control section, and
  a second open/close switch connected between the shutter drive motor and rotation control section,
when the detection pin is pushed into the imaging device, the first open/close switch opens to electrically disconnect the braking control section from the solenoid, and at a same time, the second open/close switch closes to electrically connect together the rotation control section and shutter drive motor, and
when the detection pin is not pushed into the imaging device, the first open/close switch closes to electrically connect together the braking control section and solenoid so as to move the solenoid straight so that the solenoid comes into contact with the disk-shaped shutter, and the second open/close switch opens to electrically disconnect the rotation control section from the shutter drive motor.

7. The imaging device of claim 1, wherein
the detection section comprises:
  a first connector provided on the removable lens section, and
  a second connector provided on the imaging device,
a signal line connecting together the second connector and detection control section is pulled up,
when engagement between the first and second connectors is detected, the detection control section outputs a rotation control signal adapted to rotate the disk-shaped shutter, and
when disengagement of the first connector from the second connector is detected, the detection control section outputs a brake control signal adapted to stop the disk-shaped shutter.

8. The imaging device of claim 1, wherein
the detection section comprises:
  a first connector provided on the removable lens section,
  a second connector provided on the imaging device, and
  a detection control section adapted to output a control signal to rotate or stop the disk-shaped shutter to the shutter control section,
the detection control section outputs a rotation control signal adapted to rotate the disk-shaped shutter when detecting engagement between the first and second connectors, and
the detection control section outputs a brake control signal adapted to stop the disk-shaped shutter when detecting disengagement of the first connector from the second connector.

* * * * *